(12) United States Patent
Yang et al.

(10) Patent No.: US 11,950,624 B2
(45) Date of Patent: Apr. 9, 2024

(54) TEST SYSTEM AND TEST METHOD FOR LIP STICKING FORCE OF TIPPING PAPER FOR CIGARETTES

(71) Applicant: CHINA TOBACCO YUNNAN INDUSTRIAL CO., LTD, Kunming (CN)

(72) Inventors: Ji Yang, Kunming (CN); Ze Liu, Kunming (CN); Qianxu Yang, Kunming (CN); Shiyun Tang, Kunming (CN); Zhenjie Li, Kunming (CN); Kai Wu, Kunming (CN); Chunbo Liu, Kunming (CN); Ruizhi Zhu, Kunming (CN); Xiaoxi Si, Kunming (CN); Wei Jiang, Kunming (CN)

(73) Assignee: CHINA TOBACCO YUNNAN INDUSTRIAL CO., LTD, Kunming (CN)

( * ) Notice: Subject to any disclaimer, the term of this patent is extended or adjusted under 35 U.S.C. 154(b) by 403 days.

(21) Appl. No.: 17/595,316

(22) PCT Filed: Dec. 30, 2020

(86) PCT No.: PCT/CN2020/141628
§ 371 (c)(1),
(2) Date: Nov. 15, 2021

(87) PCT Pub. No.: WO2022/141252
PCT Pub. Date: Jul. 7, 2022

(65) Prior Publication Data
US 2023/0105486 A1 Apr. 6, 2023

(51) Int. Cl.
*A24C 5/343* (2006.01)
*A24C 5/47* (2006.01)
(Continued)

(52) U.S. Cl.
CPC ............ *A24C 5/343* (2013.01); *A24C 5/47* (2013.01); *D21H 5/16* (2013.01); *G01N 19/04* (2013.01);
(Continued)

(58) Field of Classification Search
CPC . A24C 5/343; A24C 5/47; D21H 5/16; G01N 19/04; G01N 2203/0282; G06F 30/20; G06F 2119/14
See application file for complete search history.

(56) References Cited

U.S. PATENT DOCUMENTS

| | | | | |
|---|---|---|---|---|
| 11,320,365 B2 * | 5/2022 | Yang | ............ | A24D 3/18 |
| 11,591,496 B2 * | 2/2023 | Yang | ............ | D21H 19/82 |
| 2022/0050047 A1 * | 2/2022 | Yang | ............ | G01N 19/04 |

FOREIGN PATENT DOCUMENTS

| | | |
|---|---|---|
| CN | 102183456 A | 9/2011 |
| CN | 102519966 A | 6/2012 |

(Continued)

*Primary Examiner* — Francis C Gray
(74) *Attorney, Agent, or Firm* — Bayramoglu Law Offices LLC (57) ABSTRACT

A test system and a test method for a lip sticking force of tipping paper for cigarettes are provided. The test system includes an artificial lip and test equipment. The artificial lip is a silica gel block. The test equipment includes a friction meter testing platform, a force measuring sensor, a rigid rope, a pulley, a pulley bracket and a sample loading module. The pulley is installed on the pulley bracket, and the rigid rope slides in the pulley. The rigid rope is L-shaped, a first end of the rigid rope in a horizontal direction is connected to the force measuring sensor, and a second end of the rigid rope in a vertical direction is connected to the sample loading module. The artificial lip is located directly below the sample loading module, and the artificial lip is in contact with the sample loading module at a test position.

9 Claims, 4 Drawing Sheets

(51) Int. Cl.
*D21H 27/00* (2006.01)
*G01N 19/04* (2006.01)
*G06F 30/20* (2020.01)
*G06F 119/14* (2020.01)

(52) U.S. Cl.
CPC ..... *G06F 30/20* (2020.01); *G01N 2203/0282* (2013.01); *G06F 2119/14* (2020.01)

(56) References Cited

FOREIGN PATENT DOCUMENTS

| | | | | |
|---|---|---|---|---|
| CN | 102707040 | A | 10/2012 | |
| CN | 206684021 | U | 11/2017 | |
| CN | 109946227 | A | 6/2019 | |
| CN | 210604168 | U | 5/2020 | |
| CN | 111721702 | A | 9/2020 | |
| CN | 111723489 | A * | 9/2020 | ............... A24C 5/34 |
| CN | 112113879 | A | 12/2020 | |
| JP | 2012141320 | A | 7/2012 | |

* cited by examiner

TEST SYSTEM AND TEST METHOD FOR LIP STICKING FORCE OF TIPPING PAPER FOR CIGARETTES

CROSS REFERENCE TO THE RELATED APPLICATIONS

This application is the national phase entry of International Application No. PCT/CN2020/141628, filed on Dec. 30, 2020, the entire contents of which are incorporated herein by reference.

TECHNICAL FIELD

The present invention belongs to the technical field of analysis and detection, and particularly relates to a test system and a test method for a lip sticking force of tipping paper for cigarettes.

BACKGROUND

A cigarette filter is composed of three layers, namely, acetate fiber, plug wrap paper and tipping paper. The tipping paper, also known as tip paper for a cigarette, is used to wrap the filter and bond the filter to the end of the cigarette. The tipping paper is a kind of decorative paper obtained by printing and coating the tipping base paper and processing by other methods. It is often cork or opaque white, and has the effect of improving the appearance. The tipping paper is in direct contact with the lips of smokers. Generally, only paint or ink is used to be printed on the tipping paper. When the weather is dry and consumers smoke cigarettes, a small amount of saliva may wet the tipping paper, and dry slowly during smoking. The saliva protein remaining on the lips has a binding effect on the tipping paper, so that the tipping paper on the filter sticks to the skin of the lips, and even causes the lips to tear and bleed. After smoking, the filter cannot be spit out smoothly, which seriously affects the experience of cigarette consumers.

At present, there is no measurement of the lip sticking force of the tipping paper for the cigarettes in China and other countries. Various Chinese tobacco companies and manufacturers of auxiliary materials for cigarettes mostly use artificial sensory evaluation to determine whether the tipping paper for the cigarettes sticks to the lips. No relevant standards have been issued, resulting in a big difference between the test and the determining results. In order to standardize the quality of the auxiliary materials for cigarettes, increase the comfort of cigarette consumers, and reduce the use rate of the tipping paper for the cigarettes with the lip sticking force, it is necessary to accurately measure and determine the lip sticking force of the tipping paper for the cigarettes, and establish the corresponding objective screening test method and test equipment.

SUMMARY

The present invention is proposed to solve the above-mentioned problems.

The present invention provides a test system for a lip sticking force of tipping paper for cigarettes. The test system includes: an artificial lip and test equipment.

The artificial lip is a silica gel block or a 3M low-viscosity tape.

The test equipment includes: a friction meter testing platform, a force measuring sensor, a rigid rope, a pulley, a pulley bracket and a sample loading module.

The pulley is installed on the pulley bracket, and the rigid rope slides in the pulley. The rigid rope is L-shaped, one end of the rigid rope in the horizontal direction is connected to the force measuring sensor, and the other end of the rigid rope in the vertical direction is connected to the sample loading module.

The artificial lip is located directly below the sample loading module, and the artificial lip is in contact with the sample loading module at a test position.

A friction resistance test software is installed in the friction meter testing platform, the friction meter testing platform is communicatively connected to the force measuring sensor, and the friction meter testing platform controls movement of the rigid rope and records changes of a force on the rigid rope with time and/or position.

The friction resistance test software is commercial software having a MAP software full name of MAP4.exe and purchased by Thwing-Albert Company.

The artificial lip may be a silica gel block or a 3M low-viscosity tape.

Preferably, the test system may further include: artificial saliva. During a test, the artificial saliva may be sprayed on a test surface of the artificial lip. In order to simulate human conditions more accurately, the artificial saliva at 36-37 degrees Celsius can be used.

Preferably, the artificial saliva may contain sodium chloride, potassium chloride, calcium chloride, sodium dihydrogen phosphate, magnesium chloride, urea, glucose, mucin, amylase, acid phosphatase and lysozyme.

Preferably, the artificial saliva may contain 1.40 mmol/L of sodium chloride, 0.5 mmol/L of potassium chloride, 0.1 mmol/L of calcium chloride, 0.15 mmol/L of sodium dihydrogen phosphate, 0.025 mmol/L of magnesium chloride, 0.09 mmol/L of urea, 0.2 mmol/L of glucose, 2.7 mmol/L of bovine submandibular gland salivary mucin, 2.5 units/mL of amylase, 0.004 units/mL of acid phosphatase, and 0.7 units/mL of lysozyme.

Preferably, the artificial lip may be detachably installed on an artificial lip bracket, and a horizontal adjusting component may be arranged under the artificial lip bracket. A horizontal adjusting nut may be used as the horizontal adjusting component to ensure that the artificial lip is placed horizontally.

Preferably, both ends of the rigid rope may be connected to the force measuring sensor and the sample loading module through a movable connecting piece, respectively. A snap ring may be used as the movable connecting piece. The movable connecting piece used can balance the force, and ensure that the force of the rigid rope on the force measuring sensor and the sample loading module acts on the entire surface of the contact surface on average. The snap ring is optional for the movable connecting piece.

If the rigid rope and the sample loading module are directly connected to the movable connecting piece, when the rigid rope pulls the sample loading module away from the artificial lip, the sample loading module and the artificial lip may start to separate at a certain corner of the contact surface between the two, resulting in inaccurate mechanical test results and poor repeatability.

Preferably, the sample loading module may include a counterweight and an elastic pad, where the elastic pad is fixed at a lower end of the sample loading module.

A rubber pad or silica gel block is optional for the elastic pad, and a metal block is optional for the counterweight.

A second aspect of the present invention provides a test method for a lip sticking force of tipping paper for cigarettes, using the test system according to the first aspect to perform a test. The test method includes the following steps:

attaching a to-be-tested tipping paper sample to a lower end of the sample loading module, then connecting the sample loading module to the rigid rope, and clearing a load force on the rigid rope at this time;

placing the artificial lip directly below the sample loading module;

controlling the sample loading module to descend by the friction meter testing platform, so that the artificial lip is in contact with the to-be-tested tipping paper sample with a contact area of 1.5 cm*1.5 cm; and after contact, controlling the rigid rope to pull the sample loading module away from the artificial lip until a moment of separation, and controlling movement of the rigid rope by the friction meter testing platform and recording a maximum force on the rigid rope during the test, where the force is recorded as the lip sticking force with a value of F, and classifying a lip sticking force grade and lip sticking performance according to the value of the lip sticking force by a method including:

when $0\ N \leq F < 0.2\ N$, determining that a result of the lip sticking force grade is grade 0, and the lip sticking does not exist;

when $0.2\ N \leq F < 0.3\ N$, determining that the result of the lip sticking force grade is grade 1, and the lip sticking is mild;

when $0.3\ N \leq F < 0.5\ N$, determining that the result of the lip sticking force grade is grade 2, and the lip sticking is moderate;

when $0.5\ N \leq F < 0.6\ N$, determining that the result of the lip sticking force grade is grade 3, and the lip sticking is heavy; and when $F \geq 0.6\ N$, determining that the result of the lip sticking force grade is grade 4, and the lip sticking is severe.

During the test, the maximum force on the rigid rope is a force at the moment of separation between the tipping paper and the artificial lip. At this time, the force is maximum, and called the lip sticking force.

Alternatively, during the test, the friction meter testing platform records changes of a force on the rigid rope with time and/or position, and naturally marks a peak value of the force, which is the lip sticking force.

As some tipping paper is punched, when a width of the tipping paper is cut to 1.5 cm, a punched area is avoided, and test results will be more accurate at this time.

Preferably, a running speed of the rigid rope may be controlled by the friction meter testing platform to be 40-60 mm/min, and a contact time of the artificial lip and the to-be-tested tipping paper sample may be 4-6 s.

More preferably, the running speed of the rigid rope may be controlled by the friction meter testing platform to be 50 mm/min, and the contact time of the artificial lip and the to-be-tested tipping paper sample may be 5-6 s.

Preferably, a method for attaching the to-be-tested tipping paper sample to the lower end of the sample loading module may include: attaching the to-be-tested tipping paper sample to a side of a counterweight of the sample loading module, so that a middle of the to-be-tested tipping paper completely fits with an elastic pad at the lower end of the sample loading module.

During the test, first, one side of the to-be-tested tipping paper sample is adhered to one side of the counterweight of the sample loading module, and then the to-be-tested tipping paper sample is manually tightened, so that the middle part completely fits with the elastic pad. Then, the other side of the to-be-tested tipping paper sample is adhered to the other side of the counterweight of the sample loading module. The reasons why an adhesive is not used at the contact between the to-be-tested tipping paper and the elastic pad are as follows: 1, The surface of the to-be-tested tipping paper is uneven after adhesion of the adhesive, resulting in an uneven contact surface during contact with the artificial lip, and affecting the test accuracy. 2, After the adhesive is adhered to the elastic pad, the weight changes greatly, which affects a mechanical test value. 3, If the adhesive is adhered to the elastic pad, it is inconvenient to replace the tipping paper for the cigarettes, each time it is not cleaned, the next test is affected, thereby affecting the test results.

Preferably, before the artificial lip is in contact with the to-be-tested tipping paper sample, artificial saliva may be sprayed on the artificial lip.

Preferably, a movable cover plate bracket may be designed with a drawer type process, and a movable cover plate may be loaded in the middle, which is convenient for disassembly and assembly of the artificial lip.

In the present invention, it is preferable to place the tipping paper for the cigarettes on a cutting board for cutting, and a width of the to-be-tested tipping paper sample after the cutting is equal to a width of the sample loading module of the test equipment. An upper surface area of an artificial lip sample block must also be consistent with a bottom area of the sample loading module. Gloves are worn during operation to avoid direct contact between hands and test samples.

The above technical solutions can be freely combined without contradiction.

The present invention has the following beneficial effects.

1. The present invention provides the test equipment and test method for the lip sticking force of the tipping paper for the cigarettes, which can objectively and accurately detect the lip sticking force of the tipping paper for the cigarettes, effectively avoid the fuzzy concepts of lip sticking feeling and lip injury obtained by means of traditional sensory evaluation, and avoid the defects of major influence of subjective factors, large differences in smoking results and harm to human health.

2. Through the normal running of the test equipment, the test sample is in full contact with the artificial lip to obtain the lip sticking force, which has good repeatability and good consistency with the artificial sensory evaluation, so the test accuracy is high. The test method is simple and feasible, and has certain advantages in material access, quality control, and product upgrades in the tobacco industry.

3. The method according to the present invention is fast, objective and efficient, is good in repeatability and simple in operation, greatly saves test costs, improves efficiency, and is easy to popularize and apply.

In the drawings, 1. friction meter testing platform, 2. force measuring sensor, 3. sensor drive bracket, 4. rigid rope, 5. L-shaped pulley support arm, 6. pulley, 7. pulley fixing shaft, 8. sample loading module hook, 9. sample loading module, 10. movable cover plate, 11. bottom plate horizontal nut, 12. movable cover plate bracket, and 13. bottom plate.

DETAILED DESCRIPTION OF THE EMBODIMENTS

The content of the present invention will be further described below through specific implementations.

Embodiment 1

As shown in FIG. 1 to FIG. 5, a test system for a lip sticking force of tipping paper for cigarettes is provided. The test system includes: an artificial lip, test equipment and artificial saliva.

Figure 1:
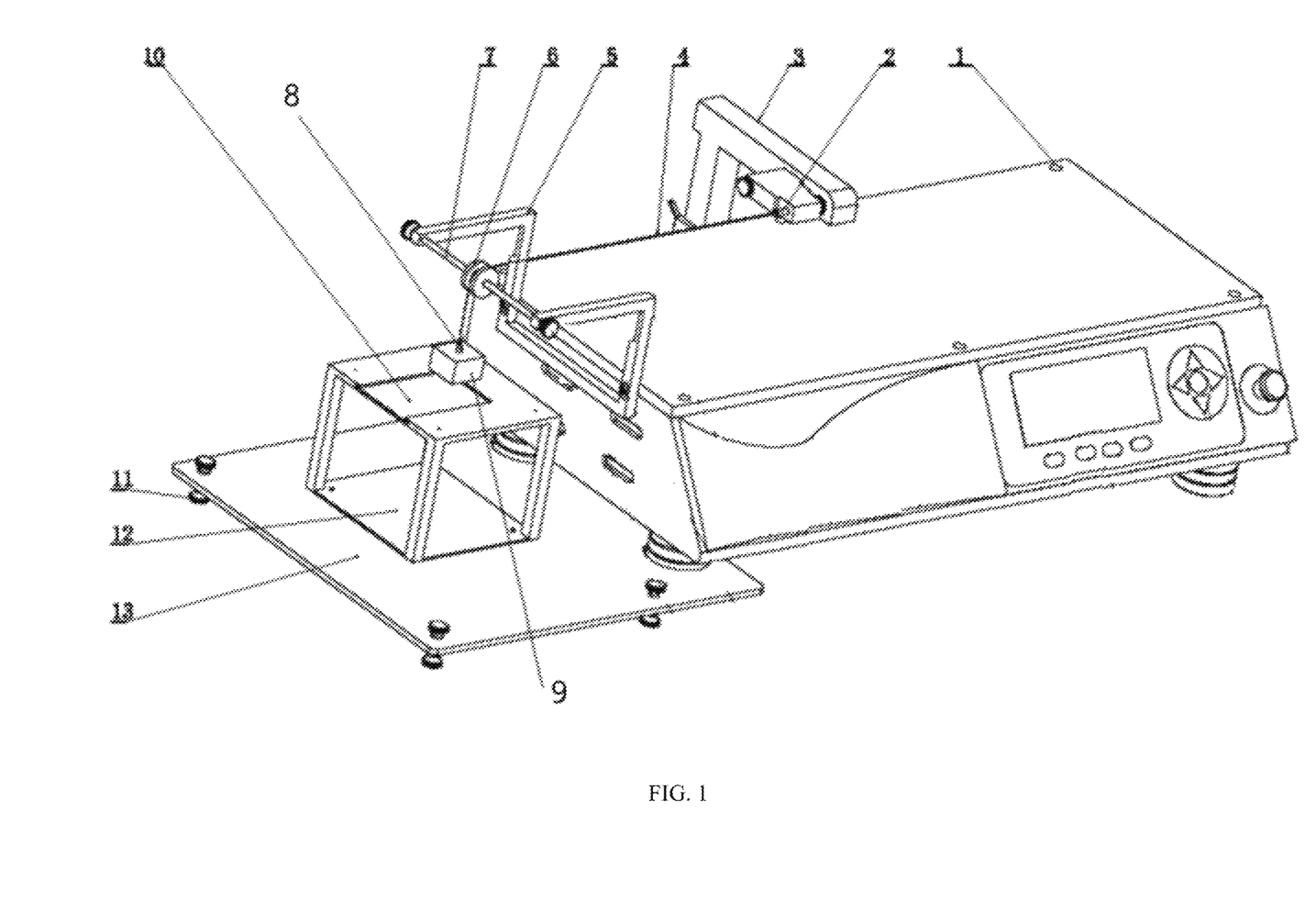
FIG. 1 is a front view of test equipment of the present invention.
Figure 2:
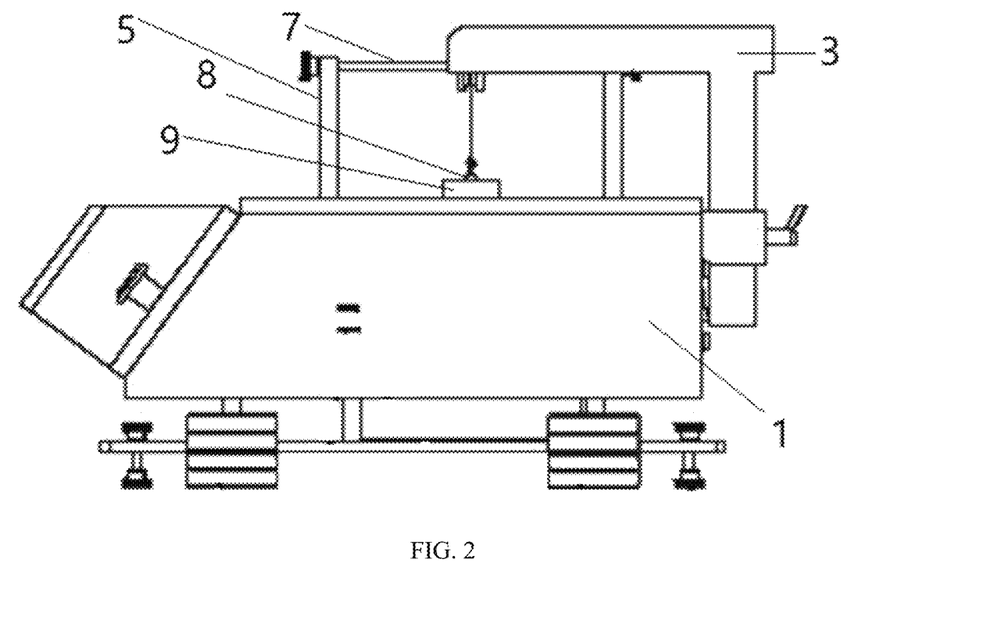
FIG. 2 is a right view of the test equipment of the present invention.
Figure 3:
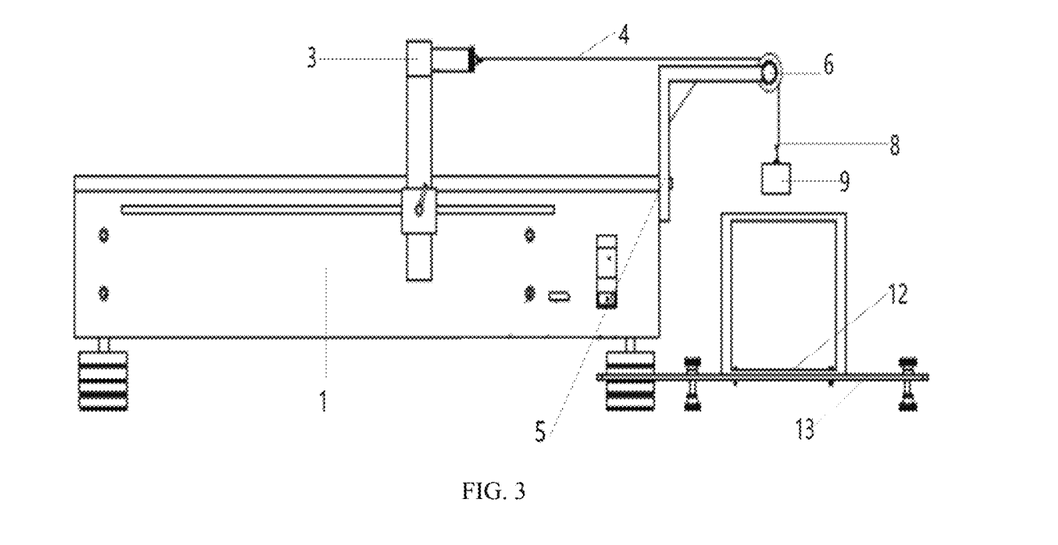
FIG. 3 is a rear view of the test equipment of the present invention.
Figure 4:
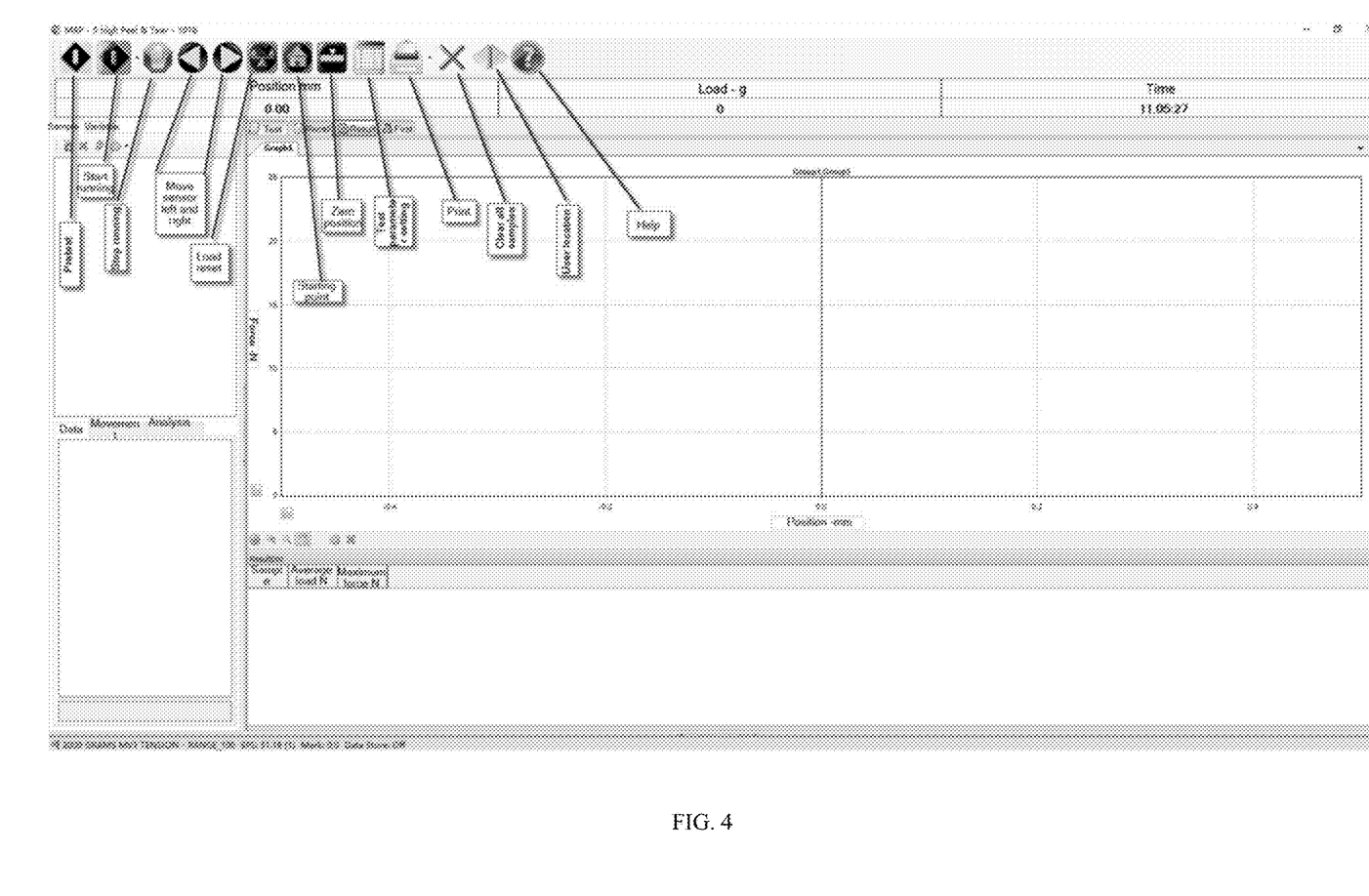
FIG. 4 is a main interface diagram of test MAP software of the present invention.
Figure 5:
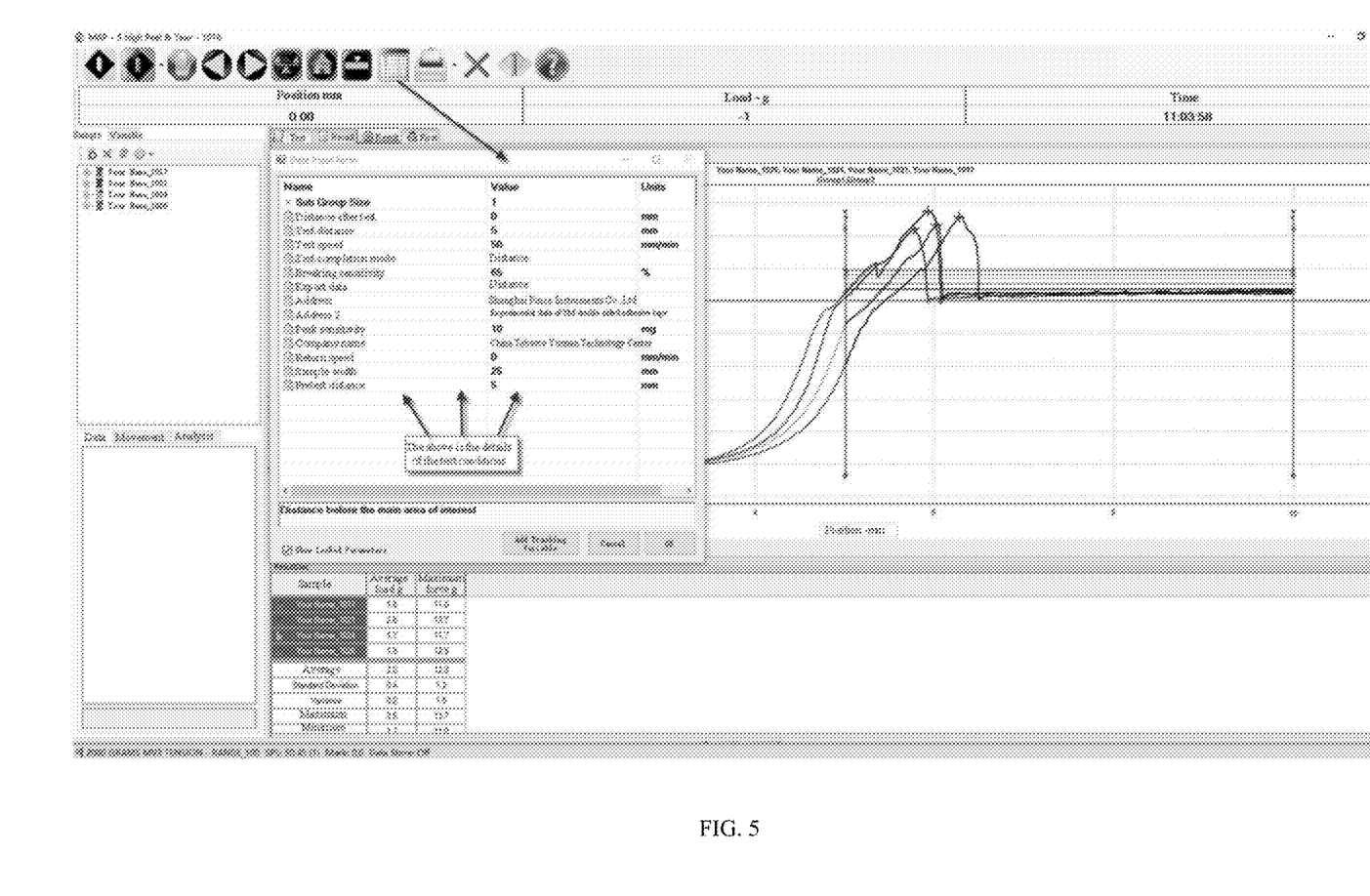
FIG. 5 is an interface diagram of detailed parameters of an experiment of the test MAP software of the present invention.

During a test, the artificial saliva is sprayed on a test surface of the artificial lip.

A 3M low-viscosity tape is used as the artificial lip, with high viscosity on one side and low viscosity on the other side. The low-viscosity side is in contact with the to-be-tested tipping paper sample, and the purchase manufacturer is 3M China Co., Ltd. The test equipment includes:
   a friction meter testing platform 1, a force measuring sensor 2, a rigid rope 4, a pulley 6, a pulley bracket and a sample loading module 9.

The rigid rope 4 is a 0.2 mm ultra-fine steel wire rope.

The force measuring sensor 2 is installed on a sensor drive bracket 3.

The pulley 6 is installed on the pulley bracket, the rigid rope 4 slides in the pulley 6, and both ends of the rigid rope 4 are connected to the force measuring sensor 2 and the sample loading module 9 through a snap ring respectively.

The artificial lip is located directly below the sample loading module 9, and the artificial lip is in contact with the sample loading module at a test position. The artificial lip is installed on an artificial lip bracket. For example, the artificial lip is clamped and fixed on the artificial lip bracket or pasted on the artificial lip bracket.

MAP software is installed in the friction meter testing platform 1. The friction meter testing platform 1 includes: a friction meter host, a friction meter display, friction meter buttons, an emergency button, a friction meter RS232 serial port, a friction meter USB interface, a friction meter power switch, a friction meter power jack, and a sensor interface. Several friction meter horizontal nuts are installed at lower four corners of the friction meter testing platform 1 to ensure the level of the friction meter.

The friction meter testing platform 1 is communicatively connected to the force measuring sensor 2 through the sensor interface, and the friction meter testing platform 1 analyzes and processes data from the force measuring sensor 2 through the MAP software. The friction meter testing platform 1 controls movement of the rigid rope 4 through the MAP software and records changes of a force on the rigid rope 4 with time and/or position.

The sample loading module 9 includes a metal block and a rubber pad, where the rubber pad is fixed at a lower end of the sample loading module 9. A sample loading module hook 8 is arranged on an upper end of the sample loading module 9 for connection with the steel wire rope.

The specific design of the artificial lip bracket is as follows. It includes a detachable movable cover plate bracket 12, and a matching movable cover plate 10 is arranged on the movable cover plate bracket 12. The movable cover plate bracket 12 is detachably arranged on a bottom plate 13, for example, through threaded connection, plug-in connection, etc. Bottom plate horizontal nuts 11 are installed under four corners of the bottom plate 13 to ensure the horizontality of the device. The movable cover plate bracket 12 includes a bottom plate with screw holes, 4 load-bearing shafts, and a plate surface with the movable cover plate on a top. The movable cover plate 10 may also be drawn out and installed from the movable cover plate bracket 12 at any time, so as to replace the artificial lip.

The specific design of the pulley bracket is as follows. It includes one pulley fixing shaft 7 and 2 L-shaped pulley support arms 5 for horizontally fixing the pulley fixing shaft 7. A low-damping pulley 6 is detachably installed on the pulley fixing shaft 7, so that the ultra-fine steel wire rope can run with a fixed track. The pulley bracket is installed on the friction meter testing platform 1 through threaded connection.

The friction meter testing platform 1 is basically rectangular. The pulley bracket is installed above a short side of the friction meter testing platform 1. The force measuring sensor 2 is installed above a long side of the friction meter testing platform 1. The steel wire rope is L-shaped, and the L-shaped turning point is realized by the pulley 6. The steel wire rope passes through the force measuring sensor 2 and the pulley 6 horizontally, and is connected to the sample loading module 9 vertically downward. Through the MAP software in the friction meter testing platform 1, the steel wire rope can be controlled to move at a certain rate.

An existing friction meter testing platform may be used as the friction meter testing platform 1, and a method for installing the force measuring sensor 2 and the movable steel wire rope on it is known.

In the present embodiment, there is no restriction on the specific structure thickness of the steel wire rope, as long as the structure can realize its function.

A test method for a lip sticking force of tipping paper for cigarettes is provided, using the above test system for a lip sticking force of tipping paper for cigarettes. The test method includes the following steps.

Step 1, the tipping paper for the cigarettes was cut. A length of a test sample of the tipping paper was equal to a width of the tipping paper for the cigarettes. A width of the test sample was equal to 1.5 cm.

Step 2, the cut test sample of the tipping paper was attached to both sides of a cube metal block of the sample loading module 9 with solid glue. Relying on the tightening effect of both sides of the test sample of the tipping paper, the middle of the test sample of the tipping paper was attached to a rubber pad at a lower end of the sample loading module 9. A bottom area of the rubber pad was 1.5 cm*1.5 cm.

Step 3, the sample loading module 9 loaded with the test sample of the tipping paper was hang on a snap ring at one end of the steel wire rope through the sample loading module hook 8.

Step 4, when the sample loading module 9 was stable and did not float, a load force on the rigid rope 4 at this time was cleared by the MAP software. The high-viscosity side of the artificial lip, namely, the 3M low-viscosity tape, was pasted on the movable cover plate 10, with the low-viscosity side facing upward. The movable cover plate 10 was installed on the movable cover plate bracket 12. A layer of artificial saliva at 36.3 degrees Celsius was sprayed on the artificial lip.

Step 5, the friction meter testing platform 1 was controlled by the MAP software to lower the sample loading module 9 to a preset contact position, so that the test sample of the tipping paper was in contact with the artificial lip for 6 s with a contact area of 1.5 cm*1.5 cm. After contact, the steel wire rope pulled the sample loading module 9 slowly away from the artificial lip until a moment of separation, and a running speed of the steel wire rope was controlled to be 50 mm/min. At this time, a maximum force on the steel wire rope and a force curve distribution graph were recorded, and a maximum force value during the test was recorded as the lip sticking force.

Step 6, the table was cleaned. The test sample of the tipping paper was removed from the sample loading module 9. Then the same batch of samples was repeatedly changed to continue the test until the tenth time, and the data was exported for analysis. An average value of the lip sticking force of 10 tests was recorded as the lip sticking force of the sample, and the value was F.

Step 7, a lip sticking force grade and lip sticking performance were classified according to the value of the lip sticking force of the sample in Step 6 by a method as follows:

When $0\ N \leq F < 0.2\ N$, it was determined that a result of the lip sticking force grade was grade 0, and the lip sticking did not exist.

When $0.2\ N \leq F < 0.3\ N$, it was determined that the result of the lip sticking force grade was grade 1, and the lip sticking was mild.

When $0.3\ N \leq F < 0.5\ N$, it was determined that the result of the lip sticking force grade was grade 2, and the lip sticking was moderate.

When $0.5\ N \leq F < 0.6\ N$, it was determined that the result of the lip sticking force grade was grade 3, and the lip sticking was heavy.

When $F \geq 0.6\ N$, it was determined that the result of the lip sticking force grade was grade 4, and the lip sticking was severe.

Then, the above Step 1 to Step 7 were repeated, and 18 different batches or different types of tipping paper were recorded as sample numbers 1-18 for the test. At the same time, the lip sticking force grade of the tipping paper for the cigarettes were evaluated according to the results of manual smoking evaluation. The summary test results are shown in Table 1.

It can be seen from Table 1 that the lip sticking force grade of the Embodiment 1 is consistent with the results of manual smoking evaluation, so the test equipment and test method of the present invention have high accuracy.

TABLE 1

Test results of lip sticking force of tipping paper for cigarettes

| Sample Number | Average value N of lip sticking force | The present invention Lip sticking Grade | The present invention Lip sticking performance | Results of manual smoking evaluation Multi-group coding dark evaluation |
|---|---|---|---|---|
| 1 | 0.3479 | 2 | Moderate lip sticking | Moderate lip sticking |
| 2 | 0.38518 | 2 | Moderate lip sticking | Moderate lip sticking |
| 3 | 0.39886 | 2 | Moderate lip sticking | Moderate lip sticking |
| 4 | 0.51442 | 3 | Heavy lip sticking | Heavy lip sticking |
| 5 | 0.2225 | 1 | Mild lip sticking | Mild lip sticking |
| 6 | 0.23524 | 1 | Mild lip sticking | Mild lip sticking |
| 7 | 0.53198 | 3 | Heavy lip sticking | Heavy lip sticking |
| 8 | 0.9482 | 4 | Severe lip sticking | Severe lip sticking |
| 9 | 0.92414 | 4 | Severe lip sticking | Severe lip sticking |
| 10 | 0.36456 | 2 | Moderate lip sticking | Moderate lip sticking |
| 11 | 0.09114 | 0 | No lip sticking | No lip sticking |
| 12 | 0.37048 | 2 | Moderate lip sticking | Moderate lip sticking |
| 13 | 0.20502 | 1 | Mild lip sticking | Mild lip sticking |
| 14 | 0.2499 | 1 | Mild lip sticking | Mild lip sticking |
| 15 | 0.22148 | 1 | Mild lip sticking | Mild lip sticking |
| 16 | 0.37734 | 2 | Moderate lip sticking | Moderate lip sticking |
| 17 | 0.24798 | 1 | Mild lip sticking | Mild lip sticking |
| 18 | 0.25698 | 1 | Mild lip sticking | Mild lip sticking |

Embodiment 2

The test was carried out using the method of Embodiment 1, and the difference was that a silica gel block was used as the artificial lip. Then, the Step 1 to Step 7 in Embodiment 1 were repeated, and 20 different batches or different types of tipping paper were recorded as sample numbers 1-20 for the test. At the same time, the lip sticking force grade of the tipping paper for the cigarettes were evaluated according to the results of manual smoking evaluation. The summary test results are shown in Table 2.

It can be seen from Table 2 that the lip sticking force grade of the Embodiment 2 is consistent with the results of manual smoking evaluation, so the test equipment and test method of the present invention have high accuracy. The test results have nothing to do with the type of silica gel, and general silica gel can be used.

TABLE 2

Test results of lip sticking force of tipping paper for cigarettes

| Sample Number | Average value N of lip sticking force | The present invention Lip sticking Grade | The present invention Lip sticking performance | Comparison results of manual smoking evaluation |
|---|---|---|---|---|
| 1 | 0.2607 | 1 | Mild lip sticking | Mild lip sticking |
| 2 | 0.2347 | 1 | Mild lip sticking | Mild lip sticking |
| 3 | 0.6159 | 4 | Severe lip sticking | Severe lip sticking |
| 4 | 0.428 | 2 | Moderate lip sticking | Moderate lip sticking |
| 5 | 0.1709 | 0 | No lip sticking | No lip sticking |
| 6 | 0.2478 | 1 | Mild lip sticking | Mild lip sticking |
| 7 | 0.1889 | 0 | No lip sticking | No lip sticking |
| 8 | 0.3403 | 2 | Moderate lip sticking | Moderate lip sticking |
| 9 | 0.267 | 1 | Mild lip sticking | Mild lip sticking |
| 10 | 0.2915 | 1 | Mild lip sticking | Mild lip sticking |
| 11 | 0.2921 | 1 | Mild lip sticking | Mild lip sticking |
| 12 | 0.1745 | 0 | No lip sticking | No lip sticking |
| 13 | 0.3002 | 2 | Moderate lip sticking | Moderate lip sticking |
| 14 | 0.5917 | 3 | Heavy lip sticking | Heavy lip sticking |
| 15 | 0.6812 | 4 | Severe lip sticking | Severe lip sticking |
| 16 | 0.5875 | 3 | Heavy lip sticking | Heavy lip sticking |
| 17 | 0.3038 | 2 | Moderate lip sticking | Moderate lip sticking |
| 18 | 0.237 | 1 | Mild lip sticking | Mild lip sticking |

TABLE 2-continued

Test results of lip sticking force of tipping paper for cigarettes

| Sample Number | Average value N of lip sticking force | The present invention | | Comparison results of manual smoking evaluation |
|---|---|---|---|---|
| | | Lip sticking Grade | performance | |
| 19 | 0.2194 | 1 | Mild lip sticking | Mild lip sticking |
| 20 | 0.6082 | 4 | Severe lip sticking | Severe lip sticking |

Comparative Example 1

The test was carried out using the method of Embodiment 1, and the difference was that a latex block was used as the artificial lip. Then, the Step 1 to Step 7 in Embodiment 1 were repeated, and 5 different batches or different types of tipping paper were recorded as sample numbers 1-5 for the test. At the same time, the lip sticking force grade of the tipping paper for the cigarettes were evaluated according to the results of manual smoking evaluation. The summary test results are shown in Table 3.

It can be seen from Table 3 that the lip sticking force grade of this comparative example is quite different from the results of manual smoking evaluation. Therefore, the test results have poor repeatability, indicating that the selection of the artificial lip plays an important role in the accuracy of the test.

TABLE 3

Test results of lip sticking force of tipping paper for cigarettes

| Sample Number | Average value N of lip sticking force | Comparative Example 1 | | Results of manual smoking evaluation |
|---|---|---|---|---|
| | | Grade | Lip sticking performance | Multi-group coding dark evaluation |
| 1 | 0.5455 | 3 | Heavy lip sticking | Moderate lip sticking |
| 2 | 0.2358 | 1 | Mild lip sticking | Moderate lip sticking |
| 3 | 0.2863 | 1 | Mild lip sticking | Moderate lip sticking |
| 4 | 0.5879 | 3 | Heavy lip sticking | Heavy lip sticking |
| 5 | 0.5234 | 3 | Heavy lip sticking | Mild lip sticking |

Comparative Example 2

The test was carried out using the method of Embodiment 1, and the difference was that a rubber pad under the sample loading module 9 was removed, and a metal block was used for the test.

Then, the Step 1 to Step 7 in Embodiment 1 were repeated, and 5 different batches or different types of tipping paper were recorded as sample numbers 1-5 for the test. At the same time, the lip sticking force grade of the tipping paper for the cigarettes were evaluated according to the results of manual smoking evaluation. The summary test results are shown in Table 4.

It can be seen from Table 4 that the lip sticking force grade of the Comparative Example 2 is quite different from the results of manual smoking evaluation. Therefore, the test results have poor repeatability. It indicates that fixing the rubber pad under the sample loading module 9 can greatly improve the test accuracy. The reason is that by fixing the rubber pad under the sample loading module, the tipping paper for cigarettes can tightly fit with the sample loading module 9, so that the data is more stable, and the repeatability is better.

TABLE 4

Test results of lip sticking force of tipping paper for cigarettes

| Sample Number | Average value N of lip sticking force | Comparative Example 2 | | Results of manual smoking evaluation |
|---|---|---|---|---|
| | | Lip sticking Grade | performance | Multi-group coding dark evaluation |
| 1 | 0.0528 | 0 | No lip sticking | Mild lip sticking |
| 2 | 0.3963 | 2 | Moderate lip sticking | Mild lip sticking |
| 3 | 0.2749 | 1 | Mild lip sticking | Moderate lip sticking |
| 4 | 0.5274 | 3 | Heavy lip sticking | Mild lip sticking |
| 5 | 0.5431 | 3 | Heavy lip sticking | Mild lip sticking |

The above are merely specific implementations of the present invention, and the protection scope of the present invention is not limited thereto. Any modification or replacement easily conceived by those skilled in the art within the technical scope of the present invention should fall within the protection scope of the present invention. Therefore, the protection scope of the present invention should be subject to the protection scope of the claims.

What is claimed is:

1. A test system for a lip sticking force of tipping paper for cigarettes, comprising: an artificial lip and test equipment,
   wherein the artificial lip is a silica gel block or a 3M low-viscosity tape;
   the test equipment comprises: a friction meter testing platform, a force measuring sensor, a rigid rope, a pulley, a pulley bracket and a sample loading module;
   the pulley is installed on the pulley bracket, and the rigid rope slides in the pulley; the rigid rope is L-shaped, a first end of the rigid rope in a horizontal direction is connected to the force measuring sensor, and a second end of the rigid rope in a vertical direction is connected to the sample loading module;
   the artificial lip is located directly below the sample loading module, and the artificial lip is in contact with the sample loading module at a test position; and
   a friction resistance test software is installed in the friction meter testing platform, the friction meter testing platform is communicatively connected to the force measuring sensor, and the friction meter testing platform controls a movement of the rigid rope and records changes of a force on the rigid rope with time and/or position.

2. The test system according to claim 1, further comprising: artificial saliva, wherein during a test, the artificial saliva is sprayed on a test surface of the artificial lip.

3. The test system according to claim 1, further comprising: an artificial lip bracket, wherein the artificial lip is installed on the artificial lip bracket, and a horizontal adjusting component is arranged under the artificial lip bracket.

4. The test system according to claim 1, wherein both ends of the rigid rope are connected to the force measuring sensor and the sample loading module through a movable connecting piece, respectively.

5. The test system according to claim 1, wherein the sample loading module comprises a counterweight and an elastic pad, wherein the elastic pad is fixed at a lower end of the sample loading module.

6. A test method for a lip sticking force of tipping paper for cigarettes, using the test system according to claim 1 to perform a test, and comprising the following steps:

attaching a to-be-tested tipping paper sample to a lower end of the sample loading module, then connecting the sample loading module to the rigid rope, and clearing a load force on the rigid rope at this time;

placing the artificial lip directly below the sample loading module;

controlling the sample loading module to descend by the friction meter testing platform, wherein the artificial lip is in contact with the to-be-tested tipping paper sample with a contact area of 1.5 cm*1.5 cm; and after contact, controlling the rigid rope to pull the sample loading module away from the artificial lip until a moment of separation, and controlling the movement of the rigid rope by the friction meter testing platform and recording a maximum force on the rigid rope during the test, wherein the maximum force is recorded as the lip sticking force with a value of F, and classifying a lip sticking force grade and lip sticking performance according to the value of the lip sticking force by a method comprising:

when $0 \text{ N} \leq F < 0.2 \text{ N}$, determining that a result of the lip sticking force grade is grade 0, and the lip sticking does not exist;

when $0.2 \text{ N} \leq F < 0.3 \text{ N}$, determining that the result of the lip sticking force grade is grade 1, and the lip sticking is mild;

when $0.3 \text{ N} \leq F < 0.5 \text{ N}$, determining that the result of the lip sticking force grade is grade 2, and the lip sticking is moderate;

when $0.5 \text{ N} \leq F < 0.6 \text{ N}$, determining that the result of the lip sticking force grade is grade 3, and the lip sticking is heavy; and when $F \geq 0.6 \text{ N}$, determining that the result of the lip sticking force grade is grade 4, and the lip sticking is severe.

7. The test method according to claim 6, wherein a running speed of the rigid rope is controlled by the friction meter testing platform to be 40 mm/min, and a contact time of the artificial lip and the to-be-tested tipping paper sample is 4-7 s.

8. The test method according to claim 6, wherein a method for attaching the to-be-tested tipping paper sample to the lower end of the sample loading module comprises: attaching the to-be-tested tipping paper sample to a side of a counterweight of the sample loading module, wherein a middle of the to-be-tested tipping paper sample completely fits with an elastic pad at the lower end of the sample loading module.

9. The test method according to claim 6, wherein before the artificial lip is in contact with the to-be-tested tipping paper sample, artificial saliva is sprayed on the artificial lip.

* * * * *